United States Patent [19]

Spease

[11] Patent Number: 4,676,119
[45] Date of Patent: Jun. 30, 1987

[54] REMOTE CONTROL LEVERED SELF ADJUST ACTUATOR

[75] Inventor: Arthur L. Spease, Livonia, Mich.

[73] Assignee: Teleflex Incorporated, Limerick, Pa.

[21] Appl. No.: 853,991

[22] Filed: Apr. 21, 1986

Related U.S. Application Data

[63] Continuation-in-part of Ser. No. 775,681, Sep. 13, 1985.

[51] Int. Cl.$^4$ ............................................. F16C 1/10
[52] U.S. Cl. .................................................. 74/501 R
[58] Field of Search ........................... 74/501 R, 501 A

[56] References Cited

U.S. PATENT DOCUMENTS

| | | | |
|---|---|---|---|
| 2,165,414 | 7/1939 | Riddell | 74/502 |
| 2,172,294 | 9/1939 | Riddell | 74/502 |
| 2,386,767 | 10/1945 | Arens | 74/502 |
| 2,553,753 | 5/1951 | Devoir | 74/502 |
| 2,858,708 | 11/1958 | Brickman | 74/502 |
| 3,118,026 | 1/1964 | Pusch et al. | 74/502 |
| 4,177,691 | 12/1979 | Fillmore | 74/501.5 R |
| 4,331,041 | 5/1982 | Bennett | 74/501.5 R |

Primary Examiner—Gary L. Smith
Assistant Examiner—Vinh Luong
Attorney, Agent, or Firm—Reising, Ethington, Barnard, Perry & Milton

[57] ABSTRACT

The assembly includes a support member (16) adapted to be connected to a support structure and the conduit (12) includes a slider member (28) slideably through the support member (16). The slider member (28) slideably disposed in a passageway (24) extending longitudinally through the support member (16). The slider member (28) includes a plurality of locking teeth (64) spaced an equal distance apart longitudinally along the slider member (28). The support member (16) includes a guideway (38) which supports a latch member (42) with a single tooth (66) for engagement with the locking teeth (64) of the slider member (28). The assembly is characterized by a cap member (48) which connects the latch member (42) to a spring (56) and pivots about one end (50) for moving the latch member into and out of engagement with the slider member (28). The cap member (48) allows transmission of a resultant force from the spring (56) only in a direction which is aligned with the transverse movement of the latch member (42) to prevent torsional forces from being transmitted to the latch member (42) from the spring (56).

16 Claims, 5 Drawing Figures

REMOTE CONTROL LEVERED SELF ADJUST ACTUATOR

RELATED APPLICATION

The subject application is a continuation-in-part of copending application Ser. No. 775,681 filed Sept. 13, 1985.

FIELD OF THE INVENTION

The subject invention relates to a motion transmitting remote control assembly of the type wherein motion is transmitted in a curved path by a flexible motion-transmitting core element movably supported by a flexible conduit.

BACKGROUND ART

Such remote control assemblies normally include means adjacent each end of the conduit for attaching the conduit to a support structure with the core element extending from each end of the conduit. It is frequently desirable to adjust the length of the conduit to change the position at one end of the core element extending from the conduit once the assembly is installed. An example of such a situation is where a remote control assembly is utilized to interconnect the accelerator pedal and a throttle valve in automobiles. In this situation, the assembly is usually installed by attaching the conduit to the body of the automobile adjacent the accelerator pedal while attaching end of the core element extending therefrom to the accelerator pedal. The opposite end of the conduit is attached to a support structure adjacent the carburetor so that the other or opposite end of the core element may be attached to the operating lever of the throttle valve. Frequently, however, the end of the core element adjacent the carburetor does not extend from the conduit a proper amount for attachment to the operating lever of the throttle valve. During such installation, the accelerator pedal is in its unmoved or idle position as is the operating lever of the throttle valve and if the end of the core element adjacent the operating lever of the throttle valve is not positioned correctly, the operating lever of the throttle valve must be moved for attachment of the core element so that the end result is that the accelerator pedal is in the idle position but the operating lever of the throttle valve is not. The position of the end if the core element extending from the conduit, i.e., the distance the core element extends from the conduit, may be changed by altering the length of the path over which the conduit extends.

DESCRIPTION OF THE PRIOR ART

There are assemblies known in the prior art where an adjustment in the length of the conduit may be accomplished in order to change the distance the core element extends from the end of the conduit during an installation procedure. One type of such assemblies includes a support member adapted for attachment to a support structure with a slider member movably supported by the support member for longitudinal movement and integrally connected to the end of the conduit whereby the conduit effectively changes in length as the slider member moves relative to the support member. The support member movably supports a L-shape latch member which engages the slider member to control the longitudinal movement of the adjustment of the slider member relative to the support member. A biasing means reacts between the support member and latch member and urges the latch member into engagement with the sliding member. In order to provide for automatic adjustment of the length of the conduit, the slider member may ratchet relative to the latch member whereby once the assembly is installed, as in the environment described above, the accelerator pedal may be pushed to the full throttle position placing the core element in tension to place a longitudinal force on the conduit whereby the slider member ratchets relative to the support member to the proper adjusted position. Sometimes an inadequacy arises because the unitary latching member is L-shaped with one leg parallel to the biasing means and the other leg perpendicular to and in contact with the biasing means whereby an undesired torsional force is transmitted to the latch member from the biasing means. U.S. Pat. No. 3,710,645, granted Jan. 16, 1973, in the name of William G. Bennett et. al. and assigned to the assignee of the subject invention, discloses such a system wherein a single L-shaped latch member engages the ratcheting teeth of the slider member. The present invention solves the inadequacy without reducing the biasing force which engages the latch member into the slider member.

SUMMARY OF THE INVENTION

The subject invention relates to a motion transmitting remote control assembly of the type for transmitting forces along a curved path by a motion transmitting core element movably supported within a flexible conduit with the ends of the core element extending from the ends of the conduit. The assembly includes a support member for supporting the conduit and a locking means movable in a plane transverse to the conduit into and out of engagement with the conduit for controlling the longitudinal movement of the conduit relative to the support member. A biasing means reacts between the support member and the locking means to urge the locking means into engagement with the conduit while allowing the locking means to be moved out of engagement with the conduit in response to predetermined force. The biasing means is a spring means which reacts with the support member to provide a force in a direction parallel and spaced from the plane of the transverse movement of the locking means. A cap member interconnects the spring means and the locking means for transmitting a resultant force from the spring means to the locking means only in a direction which is aligned with the transverse movement of the locking means to prevent torsional forces from being transmitted to the locking means from the spring means.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF PREFERRED EMBODIMENT

A motion-transmitting remote control assembly constructed in accordance with the subject invention is generally shown at 10.

The assembly 10 includes a flexible conduit 12. The conduit 12 is preferably of the well known type including an inner tubular member made of organic polymeric material and surrounded by a plurality of long lay wires disposed helically thereabout with a casing of organic polymeric material disposed about the long lay wires and about the inner tubular member. A fitting (not shown) is attached to one end of the conduit 12 and is adapted by a flange with a hole therein for attaching the conduit to a support structure, such as the body of a vehicle.

A flexible motion-transmitting core element 14 is movably supported by the conduit 12 with the ends of the core element 14 extending from the ends of the conduit 12. The motion-transmitting core element 14 is a wire member, as illustrated, but also may comprise metal strands helically wound together in cable-like fashion. A coupling member (not shown), of the well known type, is disposed about the end of the core element 14 for attachment of the core element 14 to an operated or operating member. The opposite end of the core element 14 may include a similar coupling member.

Figure 1:
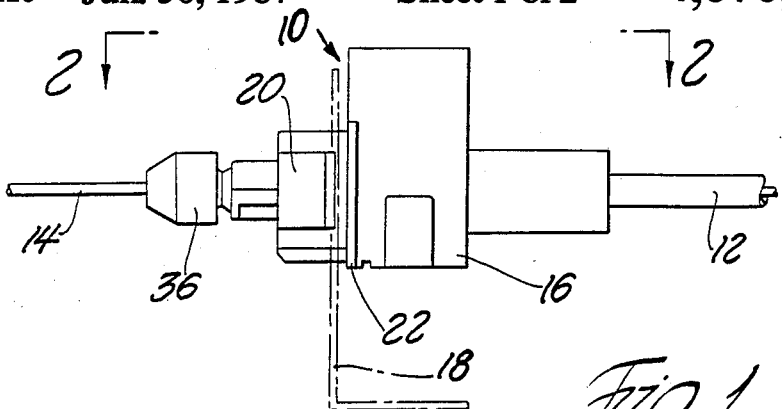
FIG. 1 is a side view of a preferred embodiment of the subject invention.
Figure 2:
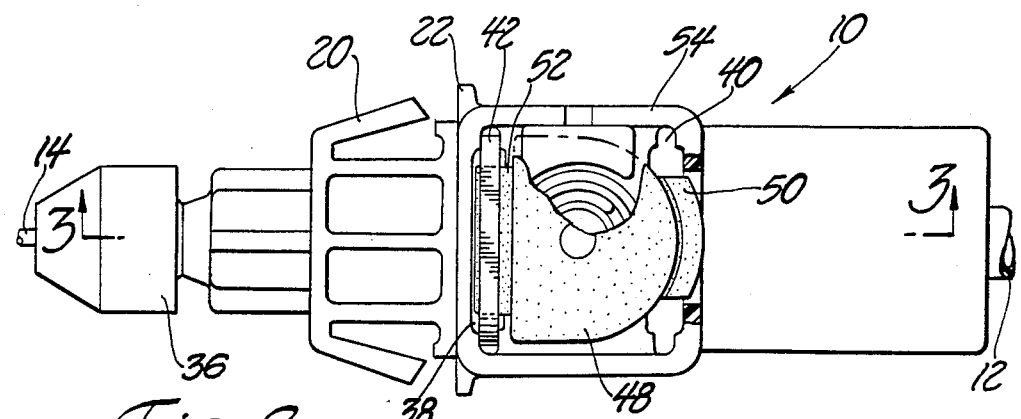
FIG. 2 is an enlarged top view taken substantially along line 2—2 of FIG. 1 and partially broken away and in cross section.

The assembly also includes a support member 16 adapted for attachment to a support structure such as the supporting bracket 18 shown in phantom in FIG. 1. The support member 16 is adapted for attachment to a support structure by snap-in means 20. The snap-in means 20 are inserted through an opening in a support member such as the bracket 18 to retain the support member 16 attached to the support bracket 18. Adjacent the snap-in means 20 is a flange 22 which forms a part of the support member 16. The snap-in means 20 may be of the type forming the subject matter of U.S. Pat. No. 3,427,894, granted to August E. Tschanz on Feb. 18, 1969, and assigned to the assignee of the subject invention.

Figure 4:
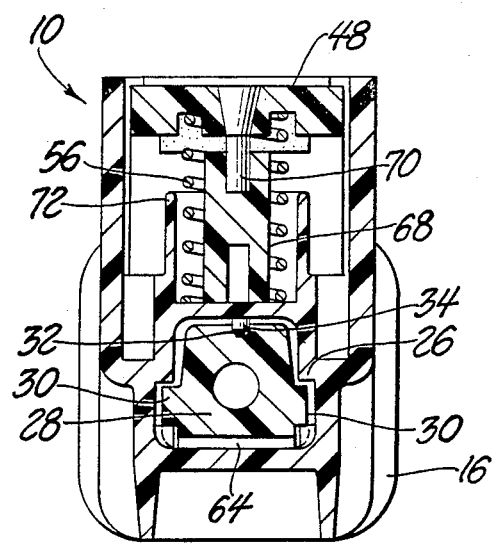
FIG. 4 is a cross-sectional view taken substantially along line 4—4 of FIG. 3.
Figure 5:
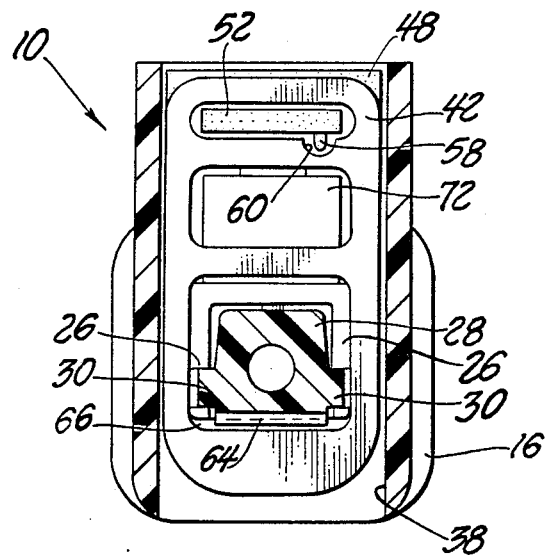
FIG. 5 is a cross-sectional view taken substantially along line 5—5 of FIG. 3.

The support member 16 includes a passageway 24 extending therethrough. Shoulders 26 (FIGS. 4 and 5) project from support member 16 into passageway 24 and extend parallel to the longitudinal axis of the passageway 24. The conduit 12 includes a slider member or sleeve 28 movably supported in the passageway 24. The slider member 28 is preferably of a rigid organic polymeric material molded about the plastic exterior of the conduit 12. The slider member 28 includes shoulders 30 on either side of the slider member 28 extending parallel to the longitudinal axis of the slider member 28. A groove 32 is disposed centrally in the top portion of the slider member 28 and extends parallel to the longitudinal axis of the slider member 28 and is engaged by guide means 34 extending downwardly from the support member 16 into the passageway 24. The shoulders 30 and the groove 32 together with guide means 34, which is a tab, increase the stability of the remove control assembly. A swiveling dust cover and/or core wiper 36 is supported through a swivel socket on the end of the slider member 28.

The support member 16 also includes a pair of guideways 38 and 40 extending transversely to the passageway 24 and through the support member 16.

The assembly also includes coacting locking means which includes a latch member 42 engageable with the slider member 28 of the conduit 12 for controlling the longitudinal movement of the conduit 12 relative to the support member 16. When the latch member 42 is engaged with the slider member 28, the shoulders 30 on the slider member 28 abut the shoulders 26 extending from the support member 16 to provide a further support and stability to the assembly.

The latch member 42 is movably supported in the guideway 38 and has an aperture 44 therethrough with the slider member 28 extending through the lower aperture 44 of the latch member 42. The latch member 42 has an upper aperture 46 located at the upper end. A rectangular cap member 48 includes lips 50 and 52 extending horizontally and outwardly from either end or side of the cap member 48, i.e. in the direction along the longitudinal axis of the cap member 48. The cap member 48 is disposed within the protective upstanding wall 54 of the support member 16 and is biased upwardly by the biasing means 56. The first lip 50 extends through an aperture 62 in the support member 16, the first lip 50 having a shoulder on the upper side of the lip 50 which is biased against the support member 16. The lip 50 also has an arcuate bottom. Consequently, the cap member 48 is pivotally connected to the support member 16 as the shoulder thereof abuts the support member 16 above the slot 62 as the tongue extends from the shoulder and into the slot. The tongue has an arcuate bottom to allow downward pivotal movement of the cap member 48 about the pivotal connection between the tongue and the slot 62. The second lip 52 extends through the aperture 46 of the latch member 42 and includes a latch orientating means 58 which is a tab projecting downwardly from the under side of the lip 52 and which mates with the notch 60 in the latch member 42.

The biasing means comprises a coil spring 56 reacting between the support member 16 and the cap member 48 for urging the cap member 48 into engagement with the latch member 42 which, inturn, engages the slider member 28 of the conduit 12. The cap member 48 is capable of pivotal movement with respect to the first lip 50 such that the latch member 42 may be disengaged. The biasing means 56 also allows the latch member 42 to be moved out of engagement with the slider member 28 in response to a predetermined force. The lower end of the spring 56 is enclosed within the cavity in the support member 16 while the upper end engages the under side of the cap member 48.

Coacting ratcheting means comprises a plurality of locking teeth 64 on the slider member and a single tooth 66 defined by the lower edge of the aperture 44 on the latch member 42 is included for automatically allowing the conduit 12 to move longitudinally relative to the support member 16 in response to a predetermined longitudinal force applied to the conduit 12 through the core element 14 whereby the distance the core element 14 extends and the conduit 12 may be adjusted. As explained above, in certain situations where tension is placed upon the core element 14, the force will be applied to the conduit 12 when its in a tortuous path urging the conduit 12 to shorten in length between its support and in such a situation the slider member 28 will ratchet forwardly to an adjusted position.

Figure 3:
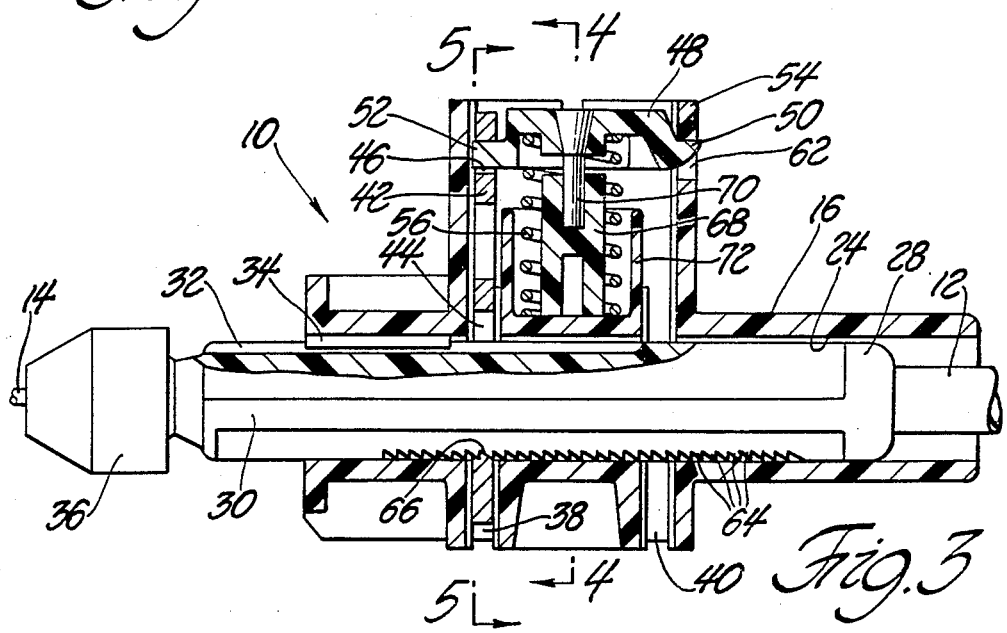
FIG. 3 is a cross-sectional view taken substantially along line 3—3 of FIG. 2.

The latch member 42 may be manually urged against the spring 56 to manually adjust the effective length of the conduit 12. Specifically, the teeth 64 on the slider member 28 and the single tooth 66 on the latch member 42 have a ratcheting configuration for allowing movement of the slider member 28 in one direction to the left, as illustrated in FIG. 3, relative to the support member 16 while engaged by the latch member 42 but prevent such movement in the opposite direction while engaged by the latch member 42 thereby effecting automatic ratcheting adjustment in the effective length of the conduit 12.

The assembly also includes a temperature-responsive means comprising an elongated slug 68 reacting between the support member 16 and the cap member 48 in parallel with the spring 56 for allowing movement of the latch member 42 in response to a predetermined force in a predetermined temperature range and for requiring higher forces to move the latch member 42 than the predetermined force at temperatures out of the predetermined temperature range. Cap member 48 reacts with the slug 68 through the pin 70 which extends from cap member 48 into the slug 68. The spring 56 encircles and surrounds the slug 68 with both disposed within and supported by a cup 72 of the support member 16. The operation of the slug 68 may be of the type forming the subject matter of U.S. Pat. No. 4,331,041 granted to William G. Bennett on May 25, 1982 and assigned to the assignee of the subject invention. Specifically, the slug 68 would allow normal operation of the latch member 42 in a normal ambient temperature range but would offer greater resistance to the movement of the latch member 42 as temperatures fall below the temperature range. By way of example, the slug 68 may have no effect upon the latch member 42 in its coaction with the spring 56 during assembly at an automotive plant to obtain the desired adjusted length of the conduit. However, should the automobile be subjected to cold temperatures which increases the forces necessary to be transmitted by the core element 14 the slug 68 would become more resistive to require a greater force to move the latch member 42 thereby preventing automatic or inadvertent adjustment in the length of the conduit 12 to an undesired position.

The slug 68 is made of a normally resilient organic polymeric material which increases in hardness with a decrease in temperature. As will be appreciated, the spring 56 and the slug 68 will be placed in compression upon disengaging movement of the latch member 42.

In one preferred embodiment the slug 68 was made of polyacrylate having a durometer between 60 and 90.

All of the components except the core element 14 and the latch member 42 and the spring 56 are preferably made of organic polymeric or plastic materials.

The invention has been described in illustrative manner and it is to be understood that the terminology which has been used is intended to be in the nature of words of description rather than limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A motion transmitting remote control assembly of the type for transmitting forces along a curved path by a flexible transmitting core element, said assembly comprising: a flexible conduit (12) having a opposite ends, a flexible motion transmitting core element (14) movably supported by said conduit (12), a support member (16) for supporting said conduit (12), locking means (42) movable in a plane transverse to said conduit (12) into and out of engagement with said conduit (12) for controlling the longitudinal movement thereof relative to said support member (16), biasing means (56) reacting between said support member (16) and said locking means (42) for urging said locking means (42) into engagement with said conduit (12) while allowing said locking means (42) to be moved out of engagement with said conduit (12) in response to a predetermoned force, said biasing means (56) further characterized by a spring means (56), said spring means (56) reacting with said support member (16) to provide a force in a direction parallel and laterally spaced from the plane of transverse movement of said locking means (42), a separate cap member (48) interconnecting said spring means (56) and said locking means (42) for transmitting a resultant force from said spring means (56) to said locking means (42) only in a direction which is aligned with said transverse movement of said locking means (42) to prevent torsional forces from being transmitted to said locking means (42) from said spring means (56), said separate cap member (48) including a first end (50) retained by said support member (16) and extending in a cantilevered extension across said spring means (56) to a second end (52) attached to said locking means (42), said first end (50) of said cap member (48) being pivotally connected to said support member (16), and said locking means (42) consisting of a single latch member (42) extending between said cap member (48) and said conduit (12).

2. An assembly as set forth in claim 1 wherein said support member (16) includes a slot (62) and said first end (50) of said cap member (48) includes a shoulder abutting said support member (16) adjacent said slot (62) and a tongue extending from said shoulder into said slot (62).

3. An assembly as set forth in claim 2 wherein said tongue has an arcuate bottom to allow downward pivotal movement of said cap member (48) about the pivotal connection between said tongue and said slot (62).

4. An assembly as set forth in claim 3 wherein said first (50) and second ends (52) of said cap member (48) are asymmetrical.

5. An assembly as set forth in claim 3 wherein said second end (52) of said cap member (48) includes a rectangular tab (58) engaging said locking means (42).

6. An assembly as set forth in claim 5 wherein said conduit (12) includes a slider member (28) and a conduit orientating means (32) disposed centrally in the top portion of said slider member (28) and extending parallel to the longitudinal axis of said conduit (12), said support member (16) including a guide means (34) extending downwardly from said support member (16) and engaging said conduit orientating means (32) in said slider member (28).

7. An assembly as set forth in claim 6 wherein said conduit orientating means (32) on said slider member (28) is a groove (32) and said guide means on said support member (16) is a tab (34).

8. An assembly as set forth in claim 7 wherein said slider member (28) has a plurality of locking teeth (64).

9. An assembly as set forth in claim 8 wherein said locking teeth (64) and latch member (42) include coacting ratcheting surfaces for automatically allowing said conduit (12) and slider member (28) thereof to move longitudinally in one direction relative to said support member (16) in response to a predetermined longitudinal force applied to said conduit (12) through said core element (14).

10. An assembly as set forth in claim 9 wherein said latch member (42) is a plate having apertures (46,44) at both ends therethrough with said slider member (28) extending through said aperture at one end (44) and said rectangular tab (52) of said cap member (48) extending through the aperture at the other end (46).

11. An assembly as set forth in claim 10 wherein said rectangular tab (52) includes latch orientating means (60) for mating with the notch (60) in said latch member (42).

12. An assembly as set forth in claim 11 wherein said latch orientating means (60) is a tab (58) which projects downwardly from the underside of said rectangular tab (50).

13. An assembly as set forth in claim 12 wherein said support member (16) includes a passageway (24) extending therethrough, a guideway (38) extending transversely to said passageway (24) and said latch member (42) movably supported in said guideway (38).

14. An assembly as set forth in claim 13 wherein a temperature responsive means (68) reacts between said support member (16) and said cap member (48) in parallel with said biasing means (56) for allowing movement of said latch member (42) in response to said predetermined force and a predetermined temperatures range and for requiring higher forces than said predetermined force at temperatures out of said predetermined temperature range.

15. An assembly as set forth in claim 14 wherein said biasing means (56) comprises a coil spring (56) and said temperature responsive means (68) comprises an elongated slug (70), said spring (56) disposed about said slug (70) and reacting between said support member (16) and said cap member (48).

16. An assembly as set forth in claim 15 wherein said latch member (42) contains a single tooth (66) for engagement with said slider member (28) normally prevent longitudinal movement.

* * * * *